3,079,267
LIGHT WEIGHT CASTABLE REFRACTORIES
Howard E. Konrad, Somerville, and William L. Stafford, Martinsville, N.J., assignors to Johns-Manville Corporation, New York, N.Y., a corporation of New York
Filed Dec. 3, 1959, Ser. No. 857,101
18 Claims. (Cl. 106—64)

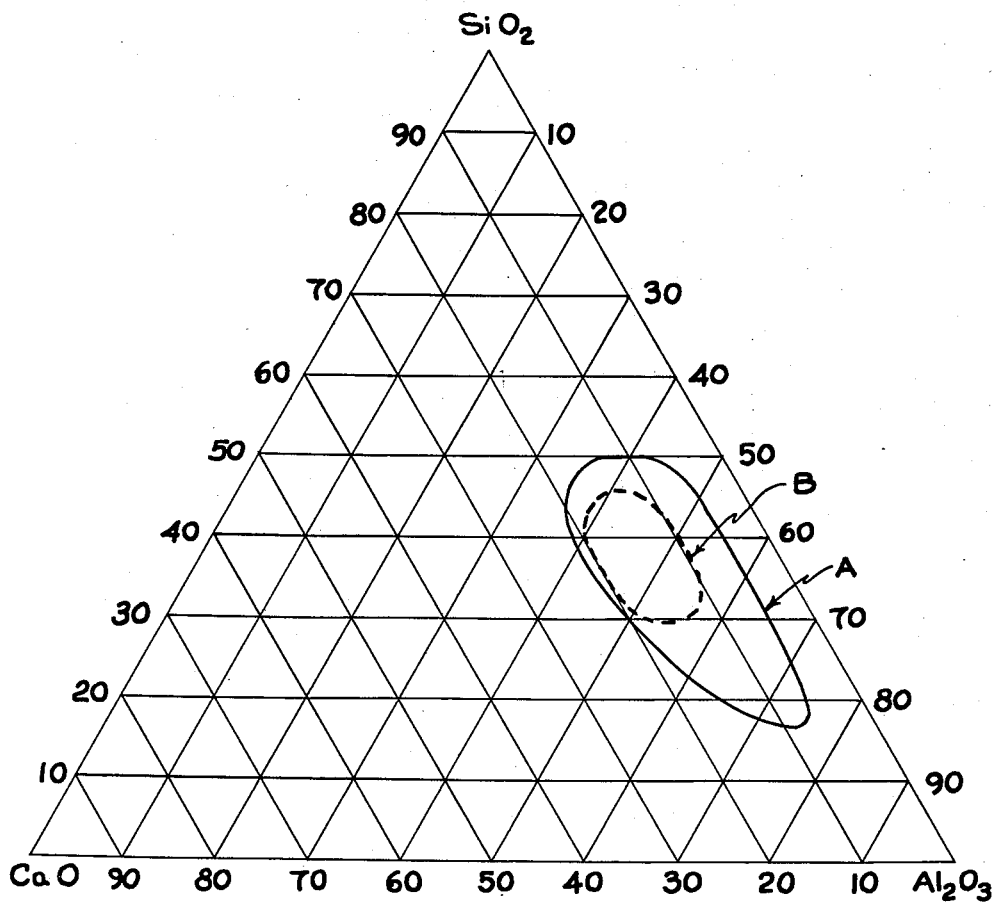

This invention relates generally to castable refractories, and more particularly to improved and novel hydraulic setting, low density castable refractory insulating products, compositions therefor, and the preparation of the same.

Lightweight or insulating firebrick have long comprised one of the most common insulating materials for use in and about boilers, industrial furnaces, and the like, notwithstanding obvious cost disadvantages. For instance, the manufacture of conventional lightweight firebrick comprising shaping and/or consolidating, firing, etc., and their installation which typically includes fitting and/or securing the brick in and about intricate shapes and objects, are involved and costly procedures. Pourable and curable in situ refractory concretes, although economical to produce, install, etc., typically are not effective insulating mediums because of their inherently high densities. Typical means for imparting low density characteristics to otherwise normally dense refractory materials, comprising incorporating therein fine combustible organic filler materials such as sawdust and subsequently destroying the same during firing, have not been found effective when applied to pourable type concrete refractories. Moreover, normal refractory materials undergo dimensional or volume changes, particularly shrinkage, upon initial firing or exposure to high temperatures. Substantial dimensional or volume stability in conventional insulating brick or the like refractories is achieved during manufacture by means of the normal firing procedure which in effect sets the volume or dimensions of the brick or like unit and any volume instability due to said firing can be compensated for by predetermining or anticipating the change. Unlike conventionally prefired refractories, castable refractories being fired in situ and typically by non-uniform exposure to high temperatures or substantially greater temperatures on one side or area than on others, must maintain substantial dimensional or volume stability and resist shrinkage, expansion or other deformation from initial setting or curing throughout their useful life to prevent cracking or the like breakage exposing the surface to be insulated.

It is a principal object of this invention to provide a low cost and effective, lightweight refractory insulation for boilers, furnaces and the like high temperature installations which effect substantial savings in manufacture and installation cost, particularly through reduced man hours or labor and processing costs.

It is also an object of this invention to provide a hydraulic setting castable refractory concrete mix which when combined with water can be readily poured and cast within forms, or the like, troweled or gunned into place resulting in compressible, lightweight insulating concrete which eliminates fitting, cutting, securing, etc., of numerous individual units or elements and which forms strong and durably integrated concrete insulating masses or bodies having densities of from about 25 to 50 lbs. per cu. ft., and typically approximately 35 lbs. per cu. ft.

It is a further object of this invention to provide a low density, hydraulic setting or curable castable refractory concrete which is capable of undergoing compression when subjected to the thermal expansion of boiler, furnace and the like components while maintaining its integrity, exhibits a minimum of thermally induced internal volumetric changes, and increases in strength upon in situ firing or exposure to elevated temperatures.

It is a still further object of this invention to provide low density castable refractory concrete insulation which exhibits substantial volume stability and increases its strength and integrity while substantially maintaining its dimensions from hydration or hydraulic setting through firing or formation of a ceramic bond due to partial vitrifictaion and under continuous service at temperatures of 2500° F. and greater.

This invention will become more fully understood and further objects and advantages thereof will become apparent from the hereinafter more detailed description and specific examples taken in consideration with the accompanying drawing in which:

FIG. 1 is a triaxial diagram indicating both the preferred and the limits of the essential components of the fired products (2500° F.) or ultimate compositions of the lightweight castable refractory products of this invention.

It has been found that the foregong objects are achieved by refractory concrete mixes essentially comprising a combination of hydraulic setting cement as the binder component, nodulated mineral wool or fiber, and alumina-silica based refractory materials wherein said constituents are of compositions and present in proportions or relative ratios so as to result in fired products, i.e., the thermal reaction products of temperatures in the vicinity of about 2500° F., which principally comprise oxides of aluminum, silicon and calcium within the approximate area defined by the line A of the triaxial diagram of FIG. 1, viz., approximately 35 to 75% by weight alumina, approximately 20 to 50% by weight silica and approximately 5 to 20% by weight calcium oxide. Lightweight castable refractory insulating concretes of the most optimum properties are produced by compositions comprising at least about 95% by weight of the oxides of aluminum, silicon and calcium wherein the ratios thereof are confined to the area defined by the broken line B of said triaxial diagram of FIG. 1, viz., approximately 40 to 60% by weight alumina, approximately 30 to 45% by weight silica and approximately 10–20% by weight calcium oxide.

Of the common impurities inherently present in most typical refractory, mineral fiber, hydraulic cement and the like materials, oxides of iron are particularly detrimental and sources which contribute iron oxides in substantial amounts should be avoided. For example, the maximum total iron oxide content should not exceed about 7% by weight of the fired product and it is highly desirable that the total iron oxide present be less than approximately 5%, and preferably even less than approximately 1 or 2%. Other typical impurities, for example, titania and the like oxides, commonly found in many sources of appropriate raw materials have not been found to be especially harmful provided, of course, that they are present only in minute amounts. Accordingly, fired compositions of the lightweight refractory concretes of this invention essentially comprise at least about 90% by weight, and preferably 95% by weight of the oxides of aluminum, silicon and calcium with not more than 7% by weight of iron oxides and preferably less than about 5% total iron oxides.

The hydraulic setting binder components for the lightweight insulation refractory concrete preferably consist of hydraulic setting calcium aluminate cements such as Alcoa CA-25, Universal Atlas Cement Co. "Luminite," "Ciment Fondu," or the like products. Other types of hydraulic setting cements such as Portland cement generally are not suitable because of their substantial proportions of iron and/or calcium oxides which are not compatible with the prerequisite ratios of alumina, silica and calcium oxide. A hydraulic setting cement such as Portland cement, however, may be included in addition to, or substituted for a portion of other more appropriate hydraulic setting cement binders provided its inclusion does not result in a product whose ultimate total composition is without the area of effective lightweight insulating refractories.

The fibrous component comprises substantially any refractory, semi-refractory, or non-refractory common fiber or wool product resulting from any typical composition or origin, i.e., rock, slag, glass, etc., provided the fiber composition does not adulterate or divert the composition of the ultimate or fired insulation from the hereinbefore prescribed specifications. It should be noted, however, that to a point the more refractory the properties of the wool, the greater the refractoriness of the ultimate product. It is especially preferred, moreover, that the mineral fiber or wool incorporated in the castable insulting material be nodulated to further enhance the density and compressibility, and in turn the insulating characteristics and adaptability of the final products. Nodulation, of course, may be effected in substantially any manner or means common to the mineral (including glass) wool or fiber art. The following comprises exemplary illustrations of typical fibrous compositions suitable for use in the manufacture of the lightweight castable refractories of this invention:

REFRACTORY WOOL

Example A

| | Percent |
|---|---|
| Silica | 49.6 |
| Alumina | 41.5 |
| Titania | 6.6 |
| Alkalies | 0.5 |
| Calcium oxide | 0.5 |
| | 98.7 |

SEMI-REFRACTORY WOOLS

Example B

| | Percent |
|---|---|
| Silica | 42.1 |
| Alumina | 18.6 |
| Ferric oxide | 0.8 |
| Calcium oxide | 29.6 |
| Magnesium oxide | 6.5 |
| Titania | 0.5 |
| | 98.1 |

Example C

| | |
|---|---|
| Silica | 44.5 |
| Alumina | 18.6 |
| Ferric oxide | 0.4 |
| Calcium oxide | 33.2 |
| Titania | 0.9 |
| | 97.6 |

Example D

| | |
|---|---|
| Silica | 36.2 |
| Alumina | 31.5 |
| Titania | 1.4 |
| Ferric oxide | 0.6 |
| Calcium oxide | 30.0 |
| | 99.7 |

NON-REFRACTORY WOOLS

Example E

| | Percent |
|---|---|
| Silica | 48.2 |
| Alumina | 7.6 |
| Ferric oxide | 0.8 |
| Calcium oxide | 42.0 |
| Magnesium oxide | 2.0 |
| | 100.6 |

Example F

| | |
|---|---|
| Silica | 39.9 |
| Alumina | 9.5 |
| Ferric oxide | 2.5 |
| Calcium oxide | 39.7 |
| Magnesium oxide | 3.8 |
| | 94.4 |

The alumina-silica based refractory materials may comprise substantially any relatively pure mineral or synthetic source(s) of alumina and/or silica. Exemplary raw materials include clay or clay-like materials such as kaolin, bentonite; kyanite and related aluminum silicates of the sillimanite group with the general formula $Al_2SiO_5$ or $Al_2O_3 \cdot SiO_2$; hydrates of alumina such as bauxite, diaspore, gibbsite; alumina; siliceous based materials such as silica, pyrophyllite, etc. These refractory materials should be in a crushed or pulverized state to facilitate uniformity and workability of the hydraulic setting concrete mix, and to increase strength and the like characteristics of the hydrated or fired refractory. The preferred average particle size is about minus 35 mesh or smaller.

In addition to the foregoing basic or essential components or ingredients, relatively small quantities or proportions, e.g., up to about 5% by weight, of lightweight refractory filler materials such as diatomaceous earth, perlite, crushed firebrick or the like may be incorporated in the mix. However, the compositions of such lightweight fillers, and/or the proportions thereof must not be such as to disrupt the alumina-silica-calcium oxide system and prescribed relative ratios.

The hydraulic setting cement, wool and alumina-silica based refractory material components, when combined or mixed in the prescribed proportions, comprises a dry refractory concrete mix suitable for commercial sales which upon the addition of water in conventional or workable quantities and uniform dispersion, results in a pourable or plastic moldable mass or mixture suitable for casting or other means of shaping, etc. The amount of water added to the refractory concrete mix may be varied to control the workability of the plastic refractory concrete mass and to adapt the same to a particular application in accordance with the usual practices in the concrete art. Wet mixtures of the refractory concrete normally set or hydrate in about six hours, but it is often advisable not to disturb the mass by the removal of retaining or shaping means such as forms or the like, or by firing the same for approximately twenty-four hours. These hydrated or cured refractory concretes exhibit good strength characteristics and substantial compressibility both prior to, and subsequent to firing.

Firing of the said hydrated refractory concrete mixes at relatively high temperatures, e.g., up to approximately 2500° F., drives off all water, including water of hydration, and apparently produces a ceramic bond as the overall strength of the refractory increases with firing. Moreover, it appears that the formation of a ceramic bond is the result of a partial vitrification of some constituents. Accordingly, the extent to which the hydraulic bond, combustibles, volatiles, etc. are destroyed or removed, and the degre of formation of the oxides of aluminum, silicon and calcium, a ceramic bond or vitrification, and the like, obviously depends upon the temperatures to which the hydrated refractory concrete, or portions thereof, is exposed.

The relative proportions per se of the foregoing initial components or ingredients are not especially critical, it being primarily essential that the ultimate or fired product be composed of at least 90% by weight of the oxides of aluminum, silicon and calcium with not more than 7% by weight of iron oxides. However, to obtain the specified essential compositions the basic or essential ingredients consisting of hydraulic setting cement, fiber, and alumina-silica based refractory materials generally are combined within the approximate proportions of 30 to 60% by weight cement, 10 to 35% by weight nodulated fiber, and 30 to 50% by weight of alumina-silica material, or more briefly, about a 40-20-40 cement-fiber-refractory material weight ratio.

The following examples illustrate suitable lightweight castable refractory insulating concrete mixes setting forth the initial ingredients thereof and the ultimate or fired compositions comprising oxides of said ingredients. It is to be understood that the hereinafter exemplary formulations are given for purposes of illustration rather than limitation and that the specified ingredients or sources thereof set forth are merely exemplary and are not to be construed to limit the invention to any particular material in practicing the same.

*Example I*

|  | Percent |
|---|---|
| Refractory fiber (Example A) | 18.0 |
| Kyanite (—35 mesh) | 20.0 |
| Kaolin clay | 25.0 |
| Calcium aluminate cement (Luminite) | 37.0 |
|  | 100.0 |

*Example II*

| Semi-refractory wool (Example C) | 25.0 |
|---|---|
| Kyanite (—35 mesh) | 16.0 |
| Pyrophyllite | 18.0 |
| Bentonite | 4.0 |
| Calcium aluminate cement (Alcoa CA-25) | 37.0 |
|  | 100.0 |

*Example III*

| Semi-refractory fiber (Example C) | 18.0 |
|---|---|
| Kyanite (—35 mesh) | 20.0 |
| Pyrophyllite | 25.0 |
| Calcium aluminate cement (Luminite) | 37.0 |
|  | 100.0 |

*Example IV*

| Semi-refractory fiber (Example B) | 25.0 |
|---|---|
| Kyanite (—35 mesh) | 10.0 |
| Pyrophyllite | 13.0 |
| Kaolin (pulverized) | 15.0 |
| Calcium aluminate cement (Alcoa CA-25) | 37.0 |
|  | 100.0 |

*Example V*

| Semi-refractory wool (Example B) | 15.0 |
|---|---|
| Kyanite (—35 mesh) | 10.0 |
| Pyrophyllite | 31.0 |
| Kaolin (pulverized) | 5.0 |
| Expanded perlite | 2.0 |
| Calcium aluminate cement (Luminite) | 37.0 |
|  | 100.0 |

*Example VI*

| Non-refractory wool (Example E) | 24.0 |
|---|---|
| Kyanite (—35 mesh) | 17.0 |
| Pyrophyllite | 19.0 |
| Bentonite | 3.0 |
| Calcium aluminate cement (Alcoa CA-25) | 37.0 |
|  | 100.0 |

*Example VII*

| Non-refractory wool (Example F) | 20.0 |
|---|---|
| Kyanite (—35 mesh) | 19.0 |
| Pyrophyllite | 21.0 |
| Bentonite | 3.0 |
| Calcium aluminate cement (Alcoa CA-25) | 37.0 |
|  | 100.0 |

*Example VIII*

| Refractory wool (Example A) | 17.4 |
|---|---|
| Bentonite | 3.8 |
| Kyanite (—35 mesh) | 19.2 |
| Portland cement | 10.1 |
| Alumina (Alcoa A-5 Alumina) | 48.5 |
| Silica | 1.0 |
|  | 100.0 |

*Example IX*

| Semi-refractory wool (Example B) | 25.0 |
|---|---|
| Kyanite (—35 mesh) | 15.0 |
| Pyrophyllite | 18.0 |
| Kaolin (pulverized) | 5.0 |
| Calcium aluminate cement: |  |
| (Alcoa CA-25) | 18.5 |
| (Luminite) | 18.5 |
|  | 100.0 |

*Example X*

| Semi-refractory wool (Example D) | 18.0 |
|---|---|
| Kyanite (—35 mesh) | 20.0 |
| Pyrophyllite | 22.5 |
| Bentonite | 2.5 |
| Calcium aluminate cement (Alcoa CA-25) | 37.0 |
|  | 100.0 |

Hydraulic setting refractory concrete mixes consisting of the foregoing formulations comprising Examples I through X were combined and uniformly blended with sufficient water to result in a workable plastic mass and several like samples from each formulation were cast into molds or forms measuring 9" x 2" x 2". The samples were retained for 24 hours at ambient temperature to complete hydration and upon removal from their forms each sample was fired to 2500° F. for a period of 5 hours. All samples of the thus cured or fired shapes were measured to determine dimension or volume change and examined for cracks, etc. and each was found to be well integrated due to partial vitrification with linear dimensional changes, viz., shrinkage, averaging less than about 1%, and free of cracks or the like imperfection.

The lightweight insulating refractory concrete mixes or formulations of the foregoing examples, I to X inclusive, upon firing at 2500° F., or more precisely upon hydration and subsequent firing at 2500° F., essentially comprise oxides of their respective constituents in the proportions or percentages by weight set forth in Table I.

TABLE I

| Ex. No. | $Al_2O_3$ | $SiO_2$ | CaO | $Fe_2O_3$ | $TiO_2$ | MgO | Alkali | F | Ig Loss |
|---|---|---|---|---|---|---|---|---|---|
| I | 45.0 | 29.0 | 12.4 | 6.5 | 2.6 |  | 0.2 |  | 3.5 |
| II | 46.9 | 33.5 | 14.9 | 0.7 | 0.4 | 0.1 | 0.5 | Tr. | 0.6 |
| III | 35.4 | 36.2 | 18.4 | 7.0 | 1.0 |  | 0.25 |  | 0.9 |
| IV | 47.5 | 31.1 | 14.0 | 0.7 | 0.4 | 1.6 | 0.4 |  | 2.6 |
| V | 34.7 | 42.5 | 18.6 | 0.6 | 0.3 | 1.0 | 0.4 |  | 1.8 |
| VI | 44.5 | 34.4 | 16.7 | 0.8 | 0.2 | 0.5 | 0.5 |  | 1.0 |
| VII | 46.2 | 34.8 | 16.7 | 1.0 | 0.2 | 0.9 | 0.5 |  | 1.2 |
| VIII | 71.0 | 22.0 | 6.7 | 0.6 | 1.4 |  | 0.9 |  | 0.5 |
| IX | 41.1 | 33.2 | 16.9 | 3.6 | 0.8 | 1.6 | 0.33 |  | 0.8 |
| X | 50.6 | 33.0 | 12.1 | 0.7 | 0.5 |  | 0.5 |  | 0.4 |

Additional lightweight castable refractory compositions found to comprise satisfactory insulating concretes, i.e., having densities within the approximate range of about 30 to 40 lbs. per cu. ft. and good volume stability at all temperatures up through 2500° F. or higher, comprising the fired (2500° F.) reaction products or oxides of varying combinations or proportions of hydraulic setting cement, mineral wool, alumina-silica refractory material, and various modifying additives are set forth in Table II.

TABLE II

| Ex. No. | $Al_2O_3$ | $SiO_2$ | CaO | $Fe_2O_3$ | $TiO_2$ | MgO | Alkali | F | Ig Loss |
|---|---|---|---|---|---|---|---|---|---|
| XI | 42.0 | 41.0 | 17.0 | 0.7 | 0.4 | | | 0.4 | 0.5 |
| XII | 50.0 | 38.0 | 12.0 | 0.7 | 0.4 | | | 0.4 | 0.5 |
| XIII | 57.0 | 35.0 | 8.0 | 0.5 | 0.3 | | | 0.2 | 0.5 |
| XIV | 43.0 | 38.0 | 19.0 | 0.7 | 0.4 | | | 0.4 | 0.5 |
| XV | 50.0 | 33.0 | 17.0 | 0.8 | 0.4 | | | 0.4 | 0.5 |
| XVI | 58.0 | 29.0 | 13.0 | 0.6 | 0.4 | | | 0.4 | 0.5 |
| XVII | 49.0 | 36.0 | 15.0 | 0.7 | 0.4 | | | 0.4 | 0.5 |
| XVIII | 56.0 | 32.0 | 12.0 | 0.6 | 0.4 | | | 0.4 | 0.5 |
| XIX | 49.8 | 39.9 | 6.7 | 0.3 | 1.4 | | 0.1 | | 0.5 |
| XX | 41.9 | 37.1 | 17.2 | 0.5 | 0.2 | 0.5 | | | 0.5 |
| XXI | 71.0 | 22.0 | 6.7 | 0.3 | 1.4 | | 0.1 | | 0.5 |
| XXII | 71.0 | 22.0 | 6.7 | 0.6 | 1.4 | | 0.1 | | 0.5 |
| XXIII | 50.0 | 30.0 | 20.0 | 0.6 | 0.4 | | | 0.4 | 0.5 |
| XXIV | 40.0 | 48.0 | 12.0 | 0.6 | 0.4 | | | 0.4 | 0.5 |

It is to be understood that the scope of this invention includes all castable refractory concretes or concrete compositions which come within the defined limits of the appended claims, i.e., those initially prepared from the recited ingredients in their specified proportions and which will result upon firing at 2500° F. in the recited oxides in their specified ratios, notwithstanding the present physical condition or form thereof. In other words this application is directed to and includes all degrees or form through which the products of this invention exist in their contemplated applications—dry or unhydrated, wet, hydrated, and fired to all stages from ambient temperatures up through 2500° F. and on to temperatures resulting in complete vitrification or destruction.

It is to be noted that the present disclosure is for purposes of illustration only and that this invention includes all modifications and equivalents which fall within the scope of the appended claims.

What we claim is:

1. A lightweight, high temperature castable refractory containing essentially approximately 30 to 60% by weight of hydraulic setting cement, approximately 10 to 35% by weight of nodulated mineral wool and approximately 30 to 50% by weight of refractory material selected from the group consisting of aluminous material, siliceous material and mixtures thereof, said constituents being composed and proportioned to provide hydraulic setting refractory concrete the fired products of which have a density no greater than about 50 pounds per cubic foot and comprise at least 90% by weight of alumina, silica and calcium oxide within the ratios of the area defined by the line A of the triaxial diagram of FIG. 1 of the drawing.

2. A lightweight, high temperature castable refractory containing essentially approximately 30 to 60% by weight of hydraulic setting calcium aluminate cement, approximately 10 to 35% by weight of nodulated mineral wool and approximately 35 to 50% by weight of refractory material selected from the group consisting of aluminous material, siliceous material and mixtures thereof, said constituents being composed and proportioned to provide hydraulic setting refractory concrete the fired products of which have a density of about 25 to 50 pounds per cubic foot and comprise at least 90% by weight of alumina, silica and calcium oxide within the ratios of the area defined by the line A of a triaxial diagram of FIG. 1 of the drawing.

3. A lightweight, high temperature castable refractory containing essentially approximately 30 to 60% by weight of hydraulic setting calcium aluminate cement, approximately 10 to 35% by weight of nodulated mineral wool and approximately 30 to 50% by weight of refractory material selected from the group consisting of aluminous material, siliceous material and mixtures thereof, said constituents being composed and proportioned to provide hydraulic setting refractory concrete the fired products of which have a density of about 25 to 50 pounds per cubic foot and comprise at least 90% by weight of alumina, silica and calcium oxide in the proportions of 35 to 75% by weight of alumina, 20 to 50% by weight of silica, and 5 to 20% by weight of calcium oxide.

4. A lightweight, high temperature castable refractory containing essentially approximately 30 to 60% by weight of hydraulic setting cement, approximately 10 to 35% by weight of nodulated mineral wool and approximately 30 to 50% by weight of refractory material selected from the group consisting of aluminous material, siliceous material and mixtures thereof, said constituents being composed and proportioned to provide hydraulic setting refractory concrete the fired products of which have a density of about 25 to 50 pounds per cubic foot and comprise at least 90% by weight of alumina, silica and calcium oxide within the ratios of the area defined by the line A of the triaxial diameter of FIG. 1 of the drawing.

5. A lightweight, high temperature castable refractory concrete mix containing essentially approximately 30 to 60% by weight of hydraulic cement, approximately 10 to 25% by weight of nodulated mineral wool and approximately 30 to 50% by weight of refractory material selected from the group consisting of aluminous material, siliceous material and mixtures thereof, said constituents being composed and proportioned to provide hydraulic setting refractory concrete the fired products of which have a density of less than about 50 pounds per cubic foot and comprise at least 90% by weight of alumina, silica and calcium oxide within the ratios of the area defined by the line A of the triaxial diagram of FIG. 1 of the drawing.

6. A lightweight, high temperature castable refractory concrete mix containing essentially approximately 30 to 60% by weight of hydraulic setting calcium aluminate cement, approximately 10 to 25% by weight of nodulated mineral wool and approximately 30 to 50% by weight of refractory material selected from the group consisting of aluminous material, siliceous material and mixtures thereof, said constituents being composed and proportioned to provide hydraulic setting refractory concrete the fired products of which have a density of about 25 to 50 pounds per cubic foot and comprise at least 90% by weight of alumina, silica and calcium oxide in the proportions of 35 to 75% by weight of alumina, 20 to 50% by weight of silica and 5 to 20% by weight of calcium oxide.

7. A lightweight, high temperature castable refractory concrete mix containing essentially approximately 30 to 60% by weight of hydraulic setting calcium aluminate cement, approximately 10 to 35% by weight of nodular mineral wool and approximately 30 to 50% by weight of refractory material selected from the group consisting of kaolin, bentonite, sillimanites, kyanite, bauxite, diaspore, gibbsite, silica, and pyrophyllite, and mixtures thereof, said constituents being composed and proportioned to provide hydraulic setting refractory concrete the fired products of which have a density of about 25 to 50 pounds per cubic foot and comprise at least 90% by weight of alumina, silica and calcium oxide within the ratios of the area defined by the line A of the triaxial diameter of FIG. 1 of the drawing.

8. A lightweight, high temperature castable refractory concrete mix containing essentially approximately 30 to 60% by weight of hydraulic setting calcium aluminate cement, approximately 10 to 35% by weight of nodulated mineral wool and approximately 30 to 50% by weight of refractory material selected from the group consisting of kaolin, bentonite, sillimanites, kyanite, bauxite, diaspore, gibbsite, silica, and pyrophyllite, and mixtures thereof, said constituents being composed and proportioned to provide hydraulic setting refractory concrete the fired products of which have a density of about 30 to 50 pounds per cubic foot and comprise at least 95% by weight of alumina, silica and calcium oxide within the approximate ratios of the area defined by the line B of the triaxial diameter of FIG. 1 of the drawing.

9. A lightweight, high temperature castable refractory containing essentially approximately 30 to 60% by weight of hydraulic setting cement binder, approximately 10 to 35% by weight of nodular mineral wool and approximately 30 to 50% by weight of refractory material selected from the group consisting of aluminous material, siliceous material and mixtures thereof, said constituents being composed and proportioned to provide hydraulic setting refractory concrete the fired products of which have a density of about 25 to 50 pounds per cubic foot and consist essentially of oxides of aluminum, silicon and calcium with less than 7% by weight of iron oxides, said oxides of aluminum, silicon and calcium being present within the ratios of the area defined by the line A of the triaxial diagram of FIG. 1 of the drawing.

10. A lightweight, high temperature castable refractory containing essentially approximately 30 to 60% by weight of hydraulic setting calcium aluminate cement binder, approximately 10 to 25% by weight of nodulated mineral wool and approximately 30 to 50% by weight of refractory material selected from the group consisting of aluminous material, siliceous material and mixtures thereof, said constituents being composed and proportioned to provide hydraulic setting refractory concrete the fired products of which have a density of about 25 to 50 pounds per cubic foot and consist essentially of oxides of aluminum, silicon and calcium with less than 5% by weight of iron oxides, said oxides of aluminum, silicon and calcium being present within the ratios of the area defined by the line A of the triaxial diagram of FIG. 1 of the drawing.

11. A lightweight, high temperature castable refractory containing essentially approximately 30 to 60% by weight of hydraulic setting calcium aluminate cement binder, approximately 10 to 25% by weight of nodular mineral wool and approximately 30 to 50% by weight of refractory material selected from the group consisting of aluminous material, siliceous material and mixtures thereof, said constituents being composed and proportioned to provide hydraulic setting refractory concrete the fired products of which have a density of about 30 to 50 pounds per cubic foot and consist essentially of oxides of aluminum, silicon and calcium with less than about 5% by weight of iron oxides, said oxides of aluminum, silicon and calcium being present within the approximate ratios of the area defined by the line B of the triaxial diagram of FIG. 1 of the drawing.

12. A lightweight, high temperature castable refractory containing essentially approximately 30 to 60% by weight of hydraulic setting calcium aluminate binder, approximately 10 to 35% by weight of nodular mineral wool and approximately 30 to 50% by weight of refractory material selected from the group consisting of aluminous material, siliceous material and mixtures thereof, said constituents being composed and proportioned to provide hydraulic setting refractory concrete the fired products of which have a density of about 25 to 50 pounds per cubic foot and consist essentially of oxides of aluminum, silicon and calcium within the ratios of 35 to 75% by weight of alumina, 20 to 45% by weight of silica and 5 to 20% by weight of calcium oxide with less than 5% by weight of iron oxides.

13. A lightweight, high temperature castable refractory containing essentially approximately 30 to 50% by weight of hydraulic setting calcium aluminate cement binder, approximately 10 to 25% by weight of nodular mineral wool and approximately 30 to 50% by weight of refractory material selected from the group consisting of aluminous material, siliceous material and mixtures thereof, said constituents being composed and proportioned to provide hydraulic setting refractory concrete the fired products of which have a density of about 30 to 50 pounds per cubic foot and consist essentially of oxides of aluminum, silicon and calcium within the approximate ratios of 40 to 60% of alumina, 30 to 45% by weight of silica and 10 to 20% by weight of calcium oxide with less than about 1% by weight of iron oxides.

14. A lightweight, high temperature castable refractory containing essentially approximately 30 to 60% by weight of hydraulic setting calcium aluminate cement binder, approximately 10 to 35% by weight of nodulated mineral wool and approximately 30 to 50% by weight of refractory material selected from the group consisting of kaolin, bentonite, sillimanites, kyanite, bauxite, diaspore, gibbsite, silica, and pyrophyllite, and mixtures thereof, said constituents being composed and proportioned to provide hydraulic setting refractory concrete the fired products of which have a density of about 25 to 50 pounds per cubic foot and consist essentially of oxides of alumina, silicon and calcium with less than about 5% by weight of iron oxides, said oxides of aluminum, silicon and calcium being within the ratios of the area defined by the line A of the triaxial diagram of FIG. 1 of the drawing.

15. A lightweight, high temperature castable refractory containing essentially approximately 30 to 50% by weight of hydraulic setting calcium aluminate cement binder, approximately 10 to 25% by weight of nodulated mineral wool and approximately 30 to 50% by weight of refractory material selected from the group consisting of kaolin, bentonite, sillimanites, kyanite, bauxite, diaspore, gibbsite, silica, and pyrophyllite, and mixtures thereof, said constituents being composed and proportioned to provide hydraulic setting refractory concrete the fired products of which have a density of about 30 to 50 pounds per cubic foot and consist essentially of oxides of aluminum, silicon and calcium with less than about 5% by weight of iron oxides, said oxides of aluminum, silicon and calcium being present within the approximate ratios of the area defined by the line B of the triaxial diagram of FIG. 1 of the drawing.

16. A lightweight, high temperature refractory concrete having a density of about 25 to 50 pounds per cubic foot which consists essentially of oxides of aluminum, silicon and calcium within the ratios of the area defined by the line A of the triaxial diagram of FIG. 1 of the drawing and with less than about 7% by weight of iron oxides, said refractory concrete comprising the fired products of approximately 30 to 60% by weight of hydraulic setting cement, approximately 10 to 35% by weight of nodular mineral wool and approximately 30 to 50% by weight of a refractory material selected from the group consisting of aluminous material, siliceous material and mixtures thereof.

17. A lightweight, high temperature refractory concrete having a density of about 30 to 50 pounds per cubic foot which consists essentially of oxides of aluminum, silicon and calcium within the approximate ratios of the area defined by the line B of the triaxial diagram of FIG. 1 of the drawing and with less than approximately 5% by weight of iron oxides, said refractory concrete comprising the fired products of approximately 30 to 50% by weight of hydraulic setting calcium aluminate cement binder, approximately 10 to 25% by weight of nodulated mineral wool and approximately 30 to 50% by weight of refractory material selected from the group consisting of aluminous material, siliceous material and mixtures thereof.

18. A lightweight, high temperature refractory concrete having a density of about 30 to 50 pounds per cubic foot which consists essentially of approximately 40 to 60% by weight of alumina, approximately 30 to 45% by weight of silica and approximately 10 to 20% by weight of calcium oxide with less than approximately 5% by weight of iron oxides, said refractory concrete comprising the fired products of approximately 30 to 50% by weight of hydraulic setting calcium aluminate cement binder, approximately 10 to 25% by weight of nodular mineral wool and approximately 30 to 50% by weight of refractory material selected from the group consisting of aluminous material, siliceous material and mixtures thereof.

References Cited in the file of this patent

UNITED STATES PATENTS

| | | |
|---|---|---|
| 1,920,358 | Clark | Aug. 1, 1933 |
| 2,043,249 | Jones | June 9, 1936 |
| 2,793,128 | Emhiser | May 21, 1957 |